US009565318B2

(12) United States Patent
Tapia et al.

(10) Patent No.: US 9,565,318 B2
(45) Date of Patent: Feb. 7, 2017

(54) QUALITY OF SERVICE ADJUSTMENTS TO IMPROVE NETWORK UTILIZATION

(75) Inventors: Pablo Tapia, Snoqualmie, WA (US); Mehul Shah, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 250 days.

(21) Appl. No.: 13/273,037

(22) Filed: Oct. 13, 2011

(65) Prior Publication Data
US 2012/0092990 A1 Apr. 19, 2012

Related U.S. Application Data

(60) Provisional application No. 61/393,043, filed on Oct. 14, 2010.

(51) Int. Cl.
*H04L 12/26* (2006.01)
*H04M 15/00* (2006.01)
*H04L 12/24* (2006.01)
*H04L 12/811* (2013.01)
*H04L 12/923* (2013.01)
(Continued)

(52) U.S. Cl.
CPC ...... *H04M 15/8016* (2013.01); *H04L 12/1435* (2013.01); *H04L 41/083* (2013.01); *H04L 43/16* (2013.01); *H04L 47/38* (2013.01); *H04L 47/762* (2013.01); *H04L 47/803* (2013.01); *H04L 67/322* (2013.01); *H04M 3/2227* (2013.01); *H04M 3/367* (2013.01); *H04M 15/43* (2013.01); *H04M 15/80* (2013.01); *H04M 15/8022* (2013.01); *H04M 15/81* (2013.01); *H04L 41/5019* (2013.01); *H04M 2201/50* (2013.01);
(Continued)

(58) Field of Classification Search
CPC ............... H04L 41/083; H04L 12/1435; H04L 41/5019; H04L 43/16; H04L 47/38; H04L 47/762; H04L 47/803; H04M 15/43; H04M 15/80; H04M 15/8016; H04W 28/24; H04W 4/18; H04W 76/02
USPC ....................................................... 370/232
See application file for complete search history.

(56) References Cited

U.S. PATENT DOCUMENTS 6,151,309 A * 11/2000 Busuioc .............. H04M 3/4228
370/328
6,907,004 B1 6/2005 Ramsey et al.
(Continued)

FOREIGN PATENT DOCUMENTS

CN 101232449 7/2008

OTHER PUBLICATIONS

The PCT Search Report and Written Opinion mailed May 7, 2012 for PCT Application No. PCT/US11/56410, 11 pages.
(Continued)

*Primary Examiner* — Afshawn Towfighi
*Assistant Examiner* — Mewale Ambaye
(74) *Attorney, Agent, or Firm* — Lee & Hayes, PLLC

(57) ABSTRACT

Devices of a telecommunication network described herein are configured to reduce a service level associated with a quality of service offered by the telecommunication network to a user. The devices may reduce the service level responsive to data consumption by the user exceeding a threshold or responsive to data consumption associated with an application or data type. Also, the devices may be configured to increase a video-conversation-specific service level responsive to determining that a client device of the user is establishing a video conversation.

19 Claims, 9 Drawing Sheets

(51) Int. Cl.
   *H04L 12/927* (2013.01)
   *H04M 3/22* (2006.01)
   *H04M 3/36* (2006.01)
   *H04L 29/08* (2006.01)
   *H04L 12/14* (2006.01)
   *H04W 4/18* (2009.01)
   *H04W 28/24* (2009.01)
   *H04W 76/02* (2009.01)

(52) U.S. Cl.
   CPC .............. *H04W 4/18* (2013.01); *H04W 28/24* (2013.01); *H04W 76/02* (2013.01)

(56) References Cited

U.S. PATENT DOCUMENTS

| | | |
|---|---|---|
| 6,957,071 B1 | 10/2005 | Holur et al. |
| 6,970,442 B1 | 11/2005 | Nambirajan |
| 6,973,315 B1 | 12/2005 | Miernik et al. |
| 7,043,225 B1 | 5/2006 | Patel et al. |
| 7,116,682 B1 | 10/2006 | Waclawsky et al. |
| 7,151,749 B2 | 12/2006 | Vega-Garcia et al. |
| 7,212,544 B2 | 5/2007 | Wajda |
| 7,433,311 B1 | 10/2008 | Kalyanasundaram et al. |
| 7,587,512 B2* | 9/2009 | Ta .................... H04L 12/5695 709/226 |
| 7,656,879 B2 | 2/2010 | Riedel et al. |
| 7,701,915 B2* | 4/2010 | Curcio ............ H04L 12/5695 370/341 |
| 7,724,663 B2 | 5/2010 | Arefi et al. |
| 7,724,700 B1* | 5/2010 | Grayson et al. ............ 370/328 |
| 8,018,845 B2* | 9/2011 | Ruello et al. .............. 370/229 |
| 8,346,225 B2* | 1/2013 | Raleigh ............ H04W 28/0268 370/230 |
| 2002/0178247 A1* | 11/2002 | Shaheen et al. ............ 709/223 |
| 2004/0190488 A1 | 9/2004 | Bokish et al. |
| 2004/0223489 A1 | 11/2004 | Rotsten et al. |
| 2004/0239754 A1 | 12/2004 | Shachar et al. |
| 2004/0240405 A1 | 12/2004 | Okazaki |
| 2005/0114541 A1* | 5/2005 | Ghetie ................ H04L 47/10 709/232 |
| 2005/0198682 A1* | 9/2005 | Wright ........................ 725/96 |
| 2006/0013206 A1 | 1/2006 | Nambirajan |
| 2006/0218302 A1 | 9/2006 | Chia et al. |
| 2007/0171824 A1 | 7/2007 | Ruello et al. |
| 2008/0031212 A1* | 2/2008 | Ogura ........................ 370/338 |
| 2008/0037513 A1 | 2/2008 | Gerding et al. |
| 2008/0155087 A1 | 6/2008 | Blouin et al. |
| 2008/0165679 A1 | 7/2008 | Anderson et al. |
| 2010/0091671 A1 | 4/2010 | Lidstrom et al. |
| 2010/0115071 A1 | 5/2010 | Sanchez Santiso et al. |
| 2010/0115135 A1 | 5/2010 | Zhou et al. |
| 2010/0188975 A1 | 7/2010 | Raleigh |
| 2010/0191576 A1* | 7/2010 | Raleigh ........................ 705/10 |
| 2010/0216424 A1* | 8/2010 | Gans .................. H04L 12/14 455/405 |
| 2011/0022586 A1* | 1/2011 | Wilkinson ........ G06F 17/30306 707/720 |
| 2011/0047287 A1 | 2/2011 | Harrang et al. |
| 2012/0059951 A1 | 3/2012 | Gutarin et al. |
| 2012/0140018 A1 | 6/2012 | Pikin et al. |

OTHER PUBLICATIONS

Office Action for U.S. Appl. No. 13/273,086, mailed on Dec. 30, 2013, Pablo Tapia, "Quality of Service Adjustments to Improve Network Utilization", 18 pages.

The Extended European Search Report mailed Feb. 26, 2014 for European patent applcation No. 11833509.0, 15 pages.

Office action for U.S. Appl. No. 13/273,086, mailed on Jul. 30, 2014, Tapia et al., "Quality of Service Adjustments to Improve Network Utilization", 12 pages.

Final Office Action for U.S. Appl. No. 13/273,086, mailed on May 28, 2014, Pablo Tapia, "Quality of Service Adjustments to Improve Network Utilization", 22 pages.

The Chinese Office Action mailed Aug. 28, 2015 for Chinese patent application No. 201180055978.2, a counterpart foreign application of U.S. Appl. No. 13/273,037.

The Chinese Office Action mailed May 9, 2016 for Chinese patent application No. 201180055978.2, a counterpart foreign application of U.S. Appl. No. 13/273,037, 10 pgs.

* cited by examiner

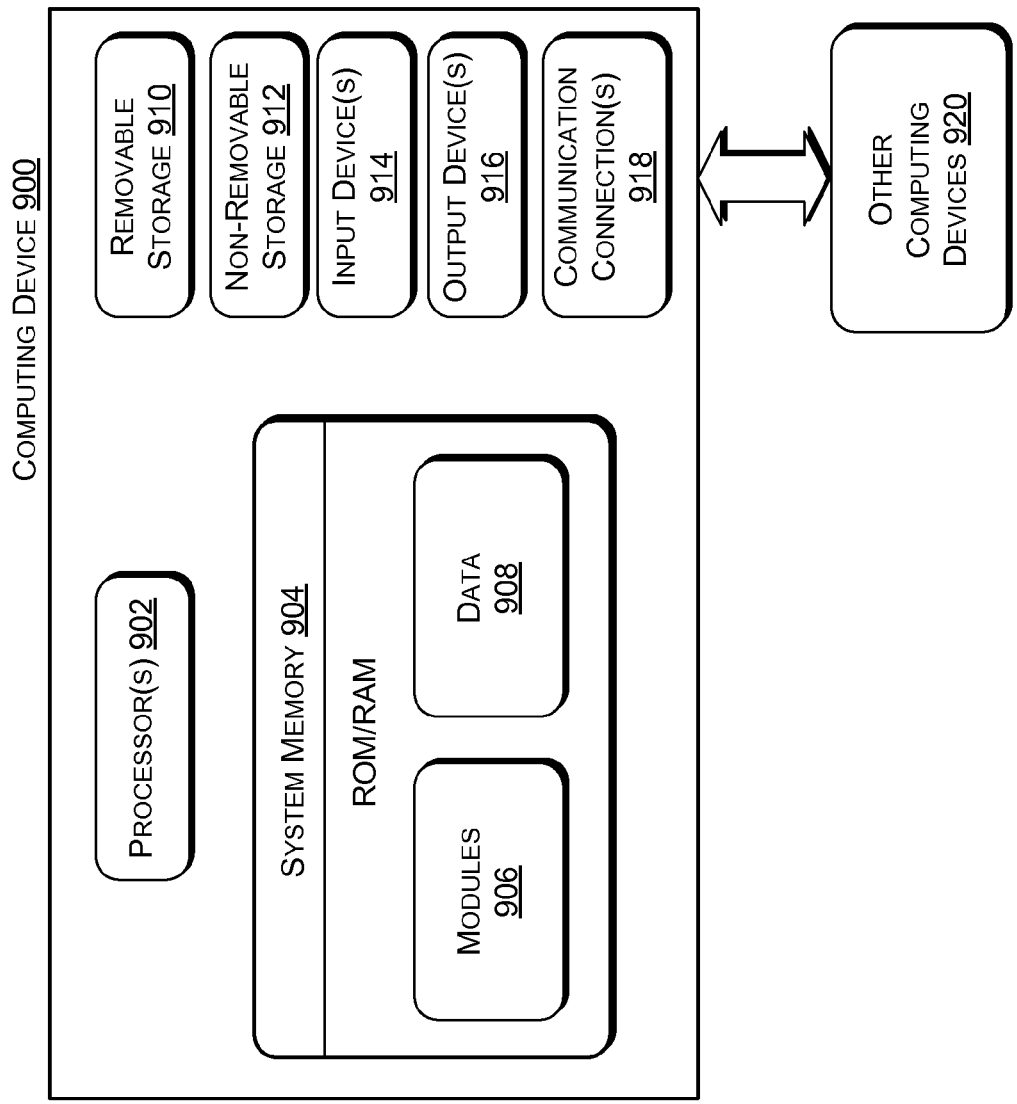

QUALITY OF SERVICE ADJUSTMENTS TO IMPROVE NETWORK UTILIZATION

RELATED APPLICATIONS

This U.S. patent application claims priority to provisional U.S. patent application No. 61/393,043, entitled "Quality of Service Control," and filed on Oct. 14, 2010. Provisional U.S. patent application No. 61/393,043 is incorporated herein in its entirety by this reference.

BACKGROUND

In recent years, telecommunications have advanced from wired calling to wireless calling and from circuit-switched networks to packet-switched networks. In addition to voice calling, telecommunications devices now allow a range of communications, from emails to text messages, support numerous applications, and provide many data services, including Internet browsing and video streaming. These new message types, applications, and other data traffic consume significant network resources, often resulting in congestion. Typically, much of this congestion is caused by a small subset of users referred to as "extreme users." Such extreme users only constitute a small fraction of total users (e.g., seven percent), but their data consumption accounts for a significant part of the network data traffic (e.g., forty-five percent).

One solution to this network congestion is to equip the network with additional resources to enhance data throughput. Adding and maintaining these resources is expensive, however, and the additional resources are often under-utilized at non-peak times of day.

Another solution to the network congestion is reducing the maximum bit rate at which service is provided to the extreme users. The reduced maximum bit rate would apply at all times of day and in all cells, however, including non-peak times and locations in which extreme user data consumption does not pose any problems. The reduced maximum bit rate also tends to result in a negative user experience for the extreme users.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 9 illustrates an example computing device system architecture, in accordance with various embodiments.

DETAILED DESCRIPTION

Described herein are techniques for reducing or increasing service levels each associated with a quality of service (QoS) offered by a telecommunication network to a user. The service levels may be priority levels or content-quality levels. Content-quality levels may be associated with higher compression or lower quality video, lower quality images, lower quality graphics, lower quality text, or lower quality audio. In some embodiments, one or more devices of the telecommunication network monitor data consumption of a user and determine whether the data consumption exceeds a threshold of a plurality of thresholds associated with increasingly larger amounts of data consumption. If the consumption exceeds one of these thresholds, the devices reduce the service level for that user and conditionally apply the reduced service level based on one or both of time of day or local network conditions. If the consumption exceeds another of these thresholds, the devices further reduce of service level and conditionally apply the further reduced service level. In further embodiments, the service level may be application-specific or data-type-specific and applied to data consumption or communication associated with a specific application or data type. In other embodiments, the devices may detect or be notified that a client device of the user is establishing or engaging in a video conversation. In response, the devices may increase a video-conversation-specific service level to provide a relatively better QoS for the video conversation than for other network traffic.

Figure 1:
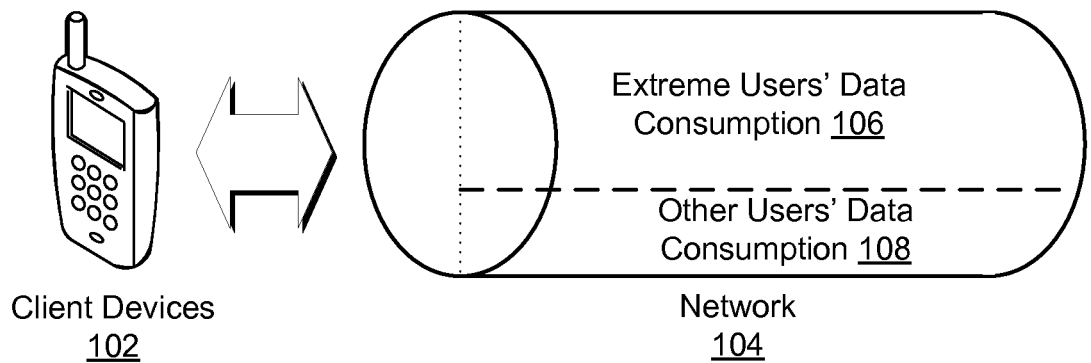
FIG. 1 is a diagram showing effects of service level adjustments in improving network utilization, in accordance with various embodiments.
Figure 1:
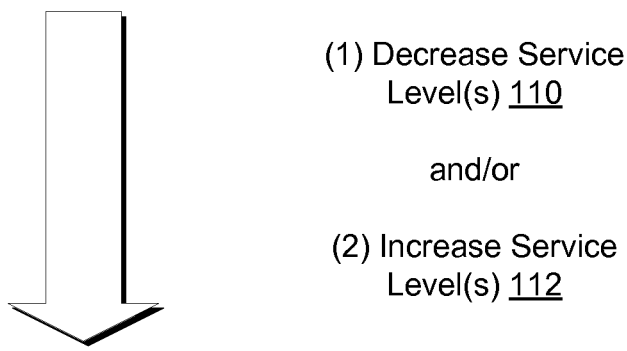
Figure 1:
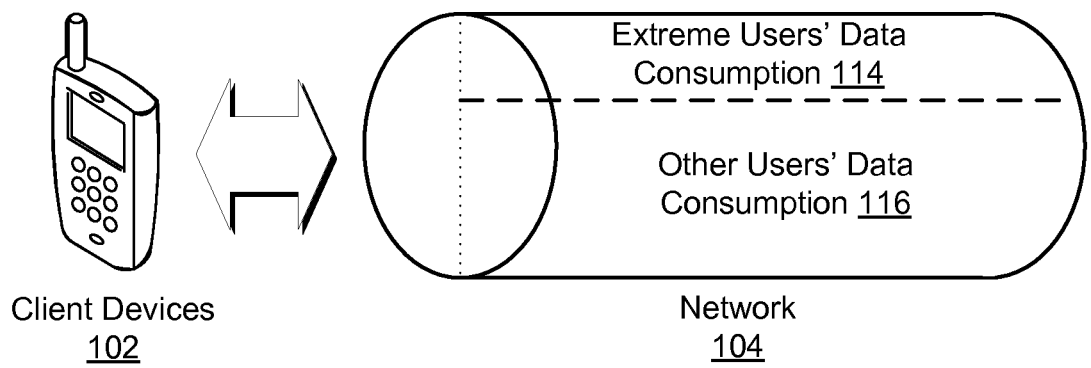

FIG. 1 is a diagram showing these techniques for reducing or increasing service levels. As illustrated, client devices 102 of users may communicate with a network 104. The client devices 102 may each be any sort of client device, such as a smart phone, a cellular phone, a personal digital assistant (PDA), a personal computer (PC), a laptop, a desktop, a workstation, a media player, a gaming device, a television, a media center, or the like. To enable video conversations, client devices 102 may be equipped with front-facing cameras or have a port capable of connecting to a peripheral camera. Examples client devices 102 are illustrated in greater detail in FIG. 9 and are described in detail below with reference to that figure.

The network 104 may be a telecommunication network providing telecommunication services, including data services, to the client device 102 and to a plurality of other devices of other users. The network 104 may be or include a public or private packet switched network, such as the Internet, circuit switched network, or combination of packet switched and circuit switched networks. The network 104 may include a plurality of computing device, such as the devices illustrated in FIG. 2, connected, for example, by one or more wide area networks (WAN), one or more local area networks (LAN), and/or one or more personal area networks (PAN). Communication between these ones of these computing devices of the network 104 may be wired, wireless, or both. These communications may utilize any sort of communication protocol known in the art for sending and receiving messages, such as the Transmission Control Protocol/Internet Protocol (TCP/IP), the Hypertext Transfer Protocol (HTTP), Extensible Messaging and Presence Protocol (XMPP), and/or the Session Initiation Protocol (SIP). Any one or more of these protocols may also be used to communicate with client devices 102 through base stations or other access points and to further communicate with one or more other networks.

In various embodiments, client devices 102 of a small part of the users—the above-mentioned extreme users—may engage in data consumption 106 that utilizes a disproportionate part of the resources of the network 104. Client devices 102 of the other users are left with a reduced part of the network resources for their data consumption 108, causing delays and interruptions in service for users. This depicted scenario of FIG. 1 (data consumptions 106 and 108) may represent total data consumption at one or more cells of the network 104 during a "busy" time of day (i.e., a time of day when data consumption is comparatively higher). During other times of day or in other cells there may be a part of the resources of the network 104 that are unused.

In response to the data consumption 106 of the extreme users, one or more devices of the network 104 may decrease 110 the service levels for the extreme users or increase 112 service levels for the other users, resulting in data traffic of the other users being given a higher QoS by the network 104 than data traffic of the extreme users. In some embodiments, the devices of the network 104 may decrease 110 service levels for extreme users when data consumption 106 for respective extreme users exceeds a threshold. The devices of the network 104 may also or instead increase 112 a video-conversation-specific service level for any users—extreme or otherwise—engaged in video conversations. In further embodiments, the devices of the network 104 may decrease 110 or increase 112 application-specific or data-type-specific service levels that apply to data consumption or communication associated with a specific application or data type. Both the decreasing 110 and increasing 112 may be accomplished by modifying the traffic classes in packet data protocol (PDP) contexts associated with the users, by creating secondary PDP contexts, or by creating or modifying service data flows. The increasing 112 may be responsive to requests from client devices 102 of the users for increased guaranteed bit rates (GBR). In one embodiment, a policy control rules function (PCRF) node of the network 104 performs the decreasing 110 and increasing 112.

In various embodiments, devices of the network 104 then distribute the modified serviced levels amongst themselves and/or other devices of the network 104 for application to the users associated with the modified service levels. As shown in FIG. 1, the modified service levels may result in a decreased part of the resources of the network 104 being utilized for data consumption 114 of the extreme users and an increased part of the resources of the network 104 being utilized for data consumption 116 of other users. In some embodiments, the modified service levels are conditionally applied to their associated users based on one or both of time of day and local network conditions (e.g., network congestion in one or more cells including the associated users).

Example Environment

Figure 2:
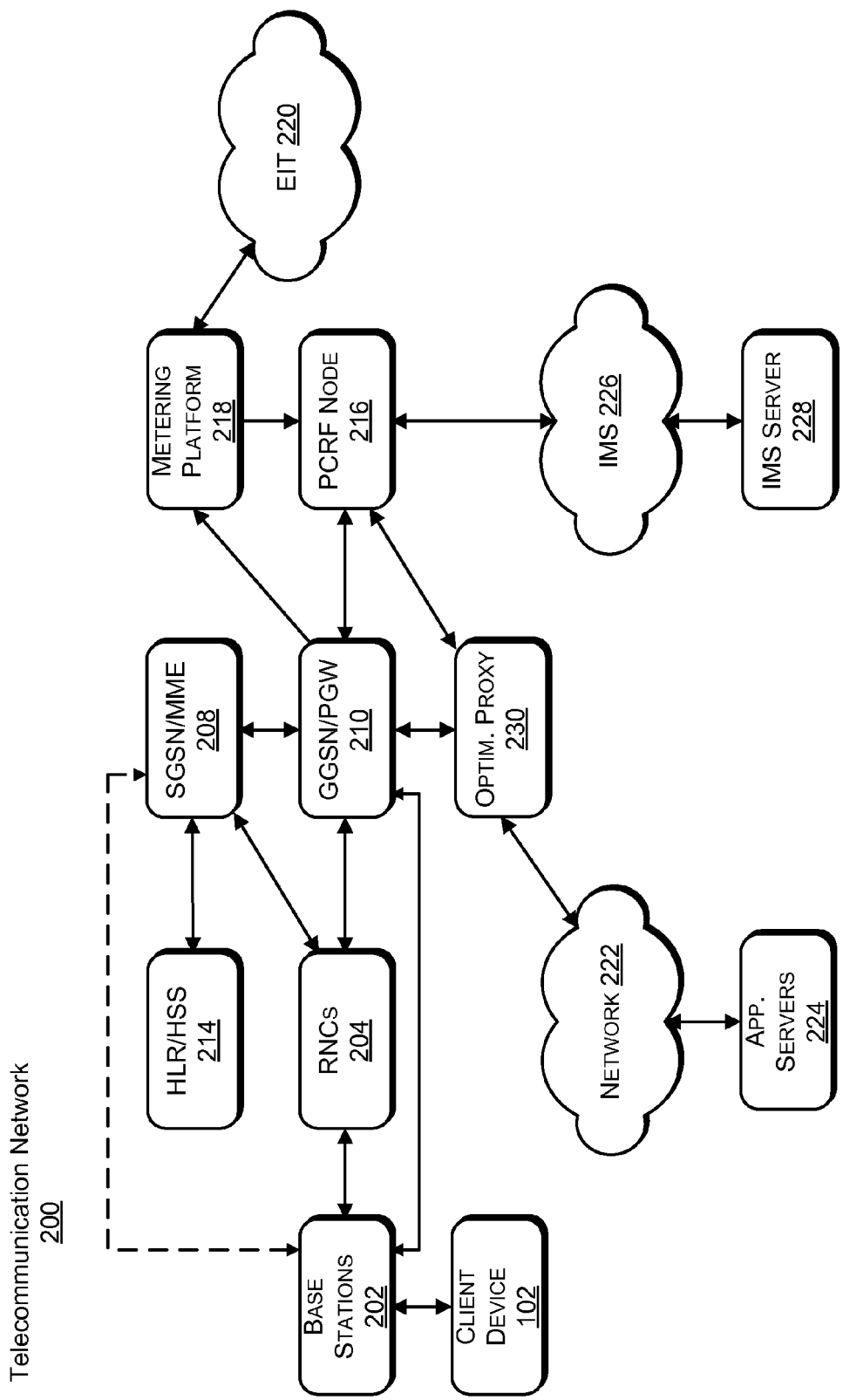
FIG. 2 illustrates a telecommunication network including devices configured to adjust service levels associated with qualities of service provided by the telecommunication network to users, in accordance with various embodiments.

FIG. 2 illustrates a telecommunication network including devices configured to adjust service levels associated with QoSs provided by the telecommunication network to users, in accordance with various embodiments. As illustrated, multiple devices of the example environment are connected to each other and communicate with each other. These connections and communications are shown by solid and dashed lines between devices. Dashed lines indicate connections associated with control messages. Solid lines indicate connections associated with data messages or with both data and control messages. When there are both dashed lines and solid lines connecting device pairs, the solid lines may indicate that only data messages are transmitted over connections between the device pairs.

As shown in FIG. 2, a telecommunication network 200 includes a plurality of computing devices and networks participating in providing telecommunication services to client devices 102. The telecommunication network 200 may be an example of network 104 and may include base stations 202 or other access points providing location-based connectivity between the client devices 102 and telecommunication network 200. The base stations 202 may in turn be connected to a gateway general packet radio service (GPRS) support node (GGSN) 210 through radio network controller (RNC) 204 or through an RNC 204 and a serving GPRS support node (SGSN) 208 or may be directly connected to the GGSN 210. When connected through an RNC 204 and SGSN 208, the base station may also have a direct connection with the SGSN 208 for control messages.

As is further shown, an HLR 214 may store information associated with users and client devices 102 of those users and may be accessible to other devices through the SGSN 208. Also, the telecommunication network 200 includes a PCRF node 216 to create or modify PDP contexts or service data flows and to provide those PDP contexts or service data flows to the GGSN 210. The PCRF node 216 may create or modify the PDP context or service data flow based on information received from a metering platform 218 and/or from the GGSN 210. The metering platform 218 may in turn be connected to and configured by an EIT network or system 220.

In further embodiments, the telecommunication network 200 may also be connected to other network(s) 222, the other networks 222 providing connectivity to application servers 224, and to Internet Protocol (IP) multimedia subsystem (IMS) network(s) 226, the IMS networks 226 providing connectivity to IMS servers 228. The other networks 222 may be accessible through an optimization proxy 230.

In some embodiments, the devices of the telecommunication network 200 are connected by a transport subnet. The transport subnet may comprise any one or more networks including one or more switching and gateway devices. For example, the transport subnet may comprise one or more WANs, LANs, and/or PANs. The transport subnet may provide connectivity between devices and networks of the telecommunication network 200. In one embodiment, the transport subnet represents a part of a GPRS core network.

In some embodiments, the base stations 202 or access points may be any sort of base stations 202 or access points known in the art. For example, the base stations 202 or access points may be Node Bs using a WCDMA/TD-SCDMA air interface technology. The base stations 202 or access points may provide client devices 102 with connectivity to the telecommunication network 200 through any of a number of types of networks, including 1G networks, 2G networks, 3G networks, 4G networks, later generation networks, LTE networks, HSPA and/or HSPA+ networks, Wi-Fi networks, or Wi-Max networks, among others. The base stations 202 or access points may also comprise stationary radio devices providing connectivity to a surrounding cell of the telecommunication network 200. In some embodiments, the base stations 202 or access points may have minimal functionality and be controlled by an RNC 204. In others, the base stations 202 may be capable of communicating directly with a GGSN 210 (which, in such embodiments, may be a Packet Gateway (PGW)).

In various embodiments, each RNC 204 may be connected to and may manage radio resources for a plurality of base stations 202 or access points for a geographic area. The RNC 204 may conditionally apply service levels found in a PDP context, secondary PDP context, or service data flow to a user of a client device 102 based on the time of day and/or network congestion conditions to the cell of the user. By conditionally applying the service levels, the RNC 204 ensures that radio resources offered by the base stations 202 or access points are equitably distributed among users of the telecommunication network 200 during busier conditions and times. In some embodiments, the telecommunication network 200 may not include an RNC 204, and these functions of the RNC 204 may be performed entirely or partly by one or more other devices of the telecommunication network 200, such as the GGSN 210.

In various embodiments, the SGSN 208 is associated with a geographical service area that includes the RNCs 204, the base stations 202 or access points, and the client devices 102. As used herein, "SGSN 208" refers to both SGSN devices and to Mobility Management Entity (MME) devices. The SGSN 208 is responsible for packet routing and a number of other functions of the telecommunication network 200, such as mobility management, logical link management, authentication, and/or billing/charging.

As mentioned above, the SGSN 208 is connected to the GGSN 210. As used herein, "GGSN 210" refers to both GGSN devices and Packet Gateway (PGW) devices. The GGSN 210 performs a number of functions for the telecommunication network 200. For example, the GGSN 210 acts as a gateway between the telecommunication network 200 and external packet switched networks, such as the Internet. The GGSN 210 is also responsible for PDP context/service data flow enforcement, receiving the PDP context and any secondary PDP contexts or the service data flow from the PCRF node 216 and disseminating the PDP context/secondary PDP contexts/service data flow to other devices of the telecommunication network 200.

The GGSN 210 may also have a role in traffic monitoring. For example, the GGSN 210 may track data consumption by a user over a billing cycle, either on an application-specific or data-type-specific basis or across all or multiple applications and data types. In one embodiment, the GGSN 210 retrieves these data consumption counts from the HLR 214. As used herein, "HLR 214" refers to both HLRs and Home Subscriber Servers (HSSs). The HLR 214 is a subscriber information database storing identifying information about subscribers of the telecommunication network 200, including the users of the client devices 102. The HLR 214 may also store additional information about subscribers, such as data consumption counts. In response to being notified of a user's data consumption, the GGSN 210 may update one or more data consumption counts (total or application-specific/data-type-specific) and optionally store the updated counts in the HLR 214. The GGSN 210 may also be configured to reset data consumption counts and service levels at the end of the billing cycle or to maintain the service levels across multiple billing cycles.

In some embodiments, the GGSN 210 may additionally notify the metering platform 218 of the current or updated data consumption counts and/or notify the PCRF node 216 of an application or data type associated with the current data consumption or communication. These notifications may be performed conditionally based on whether the current time of day is considered a busy time of day or may be performed without conditions when the counts, application types, or data types are ascertained. In one example, if a user of a client device 102 is establishing or engaged in a video conversation, the GGSN 210 may detect this and notify the PCRF node 216 of the video conversation. In response to providing the data consumption counts and/or the application notifications, the GGSN 210 may receive updated PDP contexts, secondary PDP contexts, or service data flows from the PCRF node. As mentioned above, the GGSN 210 may then disseminate the PDP contexts/secondary PDP contexts/service data flows. In other embodiments, responsive to providing the data consumption counts and/or the application notifications, the GGSN 210 may receive an indication of a reduced content-quality level and may disseminate the reduced content-quality level to the client device 102, the application server 224, the optimization proxy 230, or any other device that may affect compression or quality of content consumed by the client device 102.

In various embodiments, the metering platform 218 may be configured to receive notifications of current data consumption counts from the GGSN 210, to compare the data consumption counts to thresholds, and to notify the PCRF node 216 if the thresholds are exceeded. The thresholds may apply to total data consumption or may be application-specific or data-type-specific. The metering platform 218 utilizes multiple data consumption thresholds for increasingly larger data consumption counts (e.g., a one gigabyte threshold and a two gigabyte threshold). The metering platform may receive the thresholds from the EIT 220 or from another source. If the thresholds are not exceeded, the metering platform 218 may notify the GGSN 210, the PCRF node 216, and/or another device of the telecommunication network 200. If one or more of the thresholds has been exceeded, the metering platform may notify the PCRF node 216 of that the largest of the exceeded thresholds has been exceeded.

In further embodiments, in response to determining that a threshold has been exceeded, the metering platform 218 sends a notification for delivery to a client device 102 or for delivery to another device of the telecommunication network 200. The other device of the telecommunication network 200 may then formulate a further notification for delivery to the client device 102. The notification received by the client device 102 may notify the user of the exceeded threshold and offer the user the ability to purchase a maintained or increased QoS, or the ability to purchase some other different data plan. If the user purchased the increased or maintained QoS or the different data plan, the telecommunication network 200 may update settings, such as those stored in the HLR 214, and may apply different thresholds, fewer thresholds, or no thresholds to the data consumption of the purchasing user.

In some embodiments, EIT 220 comprises a network or system of an operator or operator group associated with the telecommunication network 200. The operator or operator group may utilize the EIT 220 to manually specify the thresholds provided to the metering platform 218. In other embodiments, the EIT 220 may include one or more learning servers that track and evaluate performance of the telecommunication network 200 over time and automatically set and adjust the thresholds utilizing machine learning techniques on tracked and evaluated performance data. In one embodiment, the learning servers may be configured to balance performance of telecommunication network resources against the need to provide high QoS to users of the telecommunication network 200. The learning server of the EIT 220 may then provide these automatically set or adjusted thresholds to the metering platform 218.

In various embodiments, the PCRF node 216 creates and modifies PDP contexts and secondary PDP contexts or service data flows for users of the client devices 102. As mentioned above, these PDP contexts, secondary PDP contexts, or service data flows may specify service levels associated with QoSs provided by the telecommunication network 200 to the users. The PCRF node 216 may create/modify the PDP contexts/service data flows based on one or more rules. These rules may specify the possible service levels and map the service levels to different situations. For example, the service levels may include a default service level for a user that has not exceeded a threshold, other, reduced service levels for exceeding thresholds specified by the EIT 220, service levels associated with different applications or data types, and/or an increased service level for video conversations. These service levels are defined relative to each other and direct the priority to be given to the network traffic of their associated users. In some embodiments, as mentioned above, the service levels are specified as traffic classes in the PDP contexts/secondary PDP contexts/service data flows.

In other embodiments, the service levels may be content-quality levels, and the PCRF node 216 modifies the settings used for compression or quality of content consumed by the client device 102. The PCRF node 216 may modify the settings based on rules map the content-quality levels to different amounts of data consumption or different types of data consumed.

The PCRF node 216 adjusts the service levels in response to receiving a notification that a data consumption threshold has been exceeded, in response to receiving notification that the user is consuming or communicating data associated with an application or data type, or in response to receiving notification that the user is establishing or engaged in a video conversation. In some embodiments, the increasing of a service level responsive to the user establishing or being engaged in a video conversation is performed conditionally based on whether the user has purchased an increased service level. The mapping of threshold to service levels found in the rules may be provided by the metering platform 218 or EIT 220, or may be entered by an operator associated with the telecommunication network 200. The mapping of applications or data types to service levels found in the rules may be built responsive to a list of applications or data types received from the GGSN 210. Once the PCRF node 216 has adjusted the service level(s) responsive to the notification(s), the PCRF node 216 provides the adjusted service levels to the GGSN 210 as PDP contexts, secondary PDP contexts, service data flows, or indications of content-quality levels In further embodiments, the PCRF node 216 may reduce a maximum bit rate responsive to notification that a user has exceeded a threshold or increase a guaranteed bit rate in response a client device request for the increased, guaranteed bit rate. Concurrently, the PCRF node 216 may increase the service level of the user to avoid doubly penalizing the user by both decreasing the user's service level and maximum bit rate. The PCRF node 216 may then provide the adjusted bit rates to the GGSN 210 for dissemination and application across the telecommunication network 200.

In some embodiments, the network 222 may be any sort of network, such as the Internet or another data network. The application server 224 may provide any sort of service, such as providing web pages for browsing, etc. In one embodiment, the application server 224 may be configured to provide the GGSN 210 with an indication of the application that the application server 224 is associated with to enable the GGSN 210 to determine the type of data or application being consumed or communicated with by the user. The application server 224 may also apply the reduced content-quality levels, altering the compression or quality of content that it communicates with the telecommunication network based on the reduced content-quality level.

Further, in some embodiments, the IMS network 226 and IMS server 228 may offer any packet-based data service, such as video chatting, video calling, text or multimedia messaging, etc. In one embodiment, the IMS server 228 may be configured to provide the GGSN 210 with an indication of the packet-based data service that the IMS server 228 is associated with to enable the GGSN 210 to determine the type of data or application being consumed or communicated with by the user.

In some embodiments, the optimization proxy 230 is a gateway proxy device between the GGSN 210 and external networks, such as networks 222. Traffic may flow to the GGSN 210 and core telecommunication network through the optimization proxy 230. The optimization proxy 230 may also be involved in reducing the service level when the service level affects content quality. In such embodiments, the optimization proxy 230 may compress or decompress content transmitted between the application server 224 and telecommunication network, or may decrease the quality of that content. The optimization proxy 230 may do this based on the reduced service level received from the GGSN 210.

In various embodiments, the base stations 202 or access points, the RNC 204, the SGSN 208, the GGSN 210, the HLR 214, the PCRF node 216, the metering platform 218, the application servers 224, the IMS servers 228, and/or the optimization proxy 230 may be implemented in any one or more computing devices, such as PCs, laptop computers, workstations, server systems, mainframes, server farms, or any other computing devices. Also, modules and data of the computing devices may be implemented in a single computing device or disturbed among multiple computing devices. An example of such a computing is illustrated in greater detail in FIG. 9 and is described in detail below with reference to that figure.

Example Operations

Figure 3:
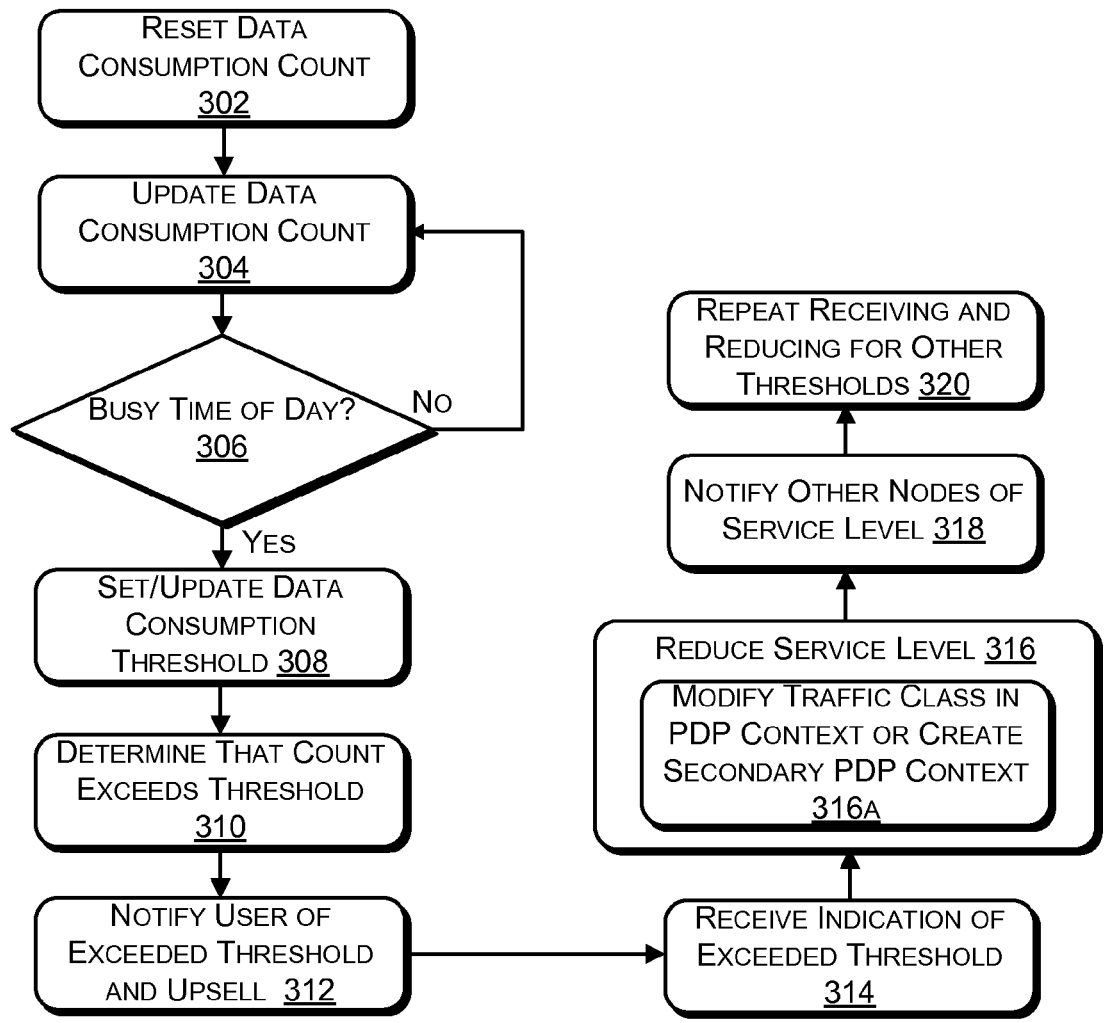
FIG. 3 illustrates a flowchart showing an example method of reducing a service level responsive to a user's data consumption exceeding a threshold, in accordance with various embodiments.

FIG. 3 illustrates a flowchart showing an example method of reducing a service level responsive to a user's data consumption exceeding a threshold, in accordance with various embodiments. As shown at block 302, a device of a telecommunication network, such as the GGSN 210 of the telecommunication network 104, may reset a data consumption count and service levels associated with a user at the beginning of a billing cycle. The data consumption count may be a single measure of the user's data consumption over the telecommunication network or may be multiple measures associated with different types of data or applications.

In one embodiment, the data consumption count includes both a measure of the user's entire data consumption as well as measures associated with different types of data or applications. In another embodiment, different data consumption measures are associated with different devices of the user. In further embodiments, the device may maintain the service levels associated with the user across multiple billing cycles.

At block 304, the device of the telecommunication network, such as the GGSN 210, may update the data consumption count based on recent activity of the user. For example, if the user has recently consumed ten megabytes of video data, the device may update counts for total data consumption, data consumption associated with video data or a video application, or both total and data-type/application-specific consumption.

At decision block 306, the device of the telecommunication network, such as the GGSN 210, determines if the current time is considered a "busy time of day" (i.e., a time of day associated with usage of the telecommunication network or of one or more cells of the telecommunication network exceeding some threshold). If the current time is not a busy time of day, the device of the telecommunication network proceeds to wait for further data consumption and update the data consumption count at block 304. If the current time is considered a busy time of day, the device of the telecommunication network may inform another device, such as the metering platform 218 of the telecommunication network 104, of the updated data consumption count.

At block 308, a device of the telecommunication network may set or update data consumption thresholds. The device may be the metering platform 218, EIT 220, or a learning server or system. The set or updated data consumption thresholds may be specified by an operator or determined using machine learning techniques. In another embodiment, different data consumption thresholds are associated with different devices of the user.

At block 310, a device of the telecommunication network, such as the metering platform 218, may determine that the updated data consumption count exceeds a set/updated data consumption threshold. At block 312, upon determining that the data consumption exceeds the threshold, a device of the telecommunication network, such as the metering platform 218 or another device of the telecommunication network 104, may notify the user that the data consumption threshold has been exceeded and offer the user an opportunity to purchase a maintained or upgraded QoS for the remainder of the billing cycle. The device of the telecommunication network may then provide an indication to another device of the telecommunication network, such as the PCRF Node 216 of the telecommunication network 104, that the data consumption exceeds the threshold.

At block 314, a device of the telecommunication network, such as the PCRF Node 216, may receive the provided indication of the exceeded threshold. In response, at block 316, the device may reduce a service level associated with the QoS offered by the telecommunication network to the user. In some embodiments, at block 316a, the device may reduce the service level by modifying a QoS traffic class in a PDP context associated with the user, by creating a secondary PDP context that specifies the reduced service level, or by creating or modifying a service data flow. Also, the service level may be application-specific or data-type-specific. In other embodiments, the device may reduce the value of a setting associated with content-quality, such as a compression metric.

At block 318, a device of the telecommunication network, such as the PCRF Node 216, notifies other devices of the telecommunication network of the reduced service level to enable the other devices to apply the reduced service level. In some embodiments, one or more devices associated with a specific cell of the telecommunication network may conditionally apply the reduced service level throughout the remainder of the billing cycle based on one or both of time of day or congestion conditions of the cell. Also, if the service level is application-specific or data-type-specific, the service level may be conditionally applied to data consumption that is associated with the application or data-type.

At block 320, one or more devices of the telecommunication network may repeat one or more of the operations shown at blocks 308-318 for one or more other thresholds. The one or more other thresholds may be associated with increasingly larger amounts of data consumption. Repetition of these operations enables use of a greater number of service levels by the telecommunication network.

Figure 4:
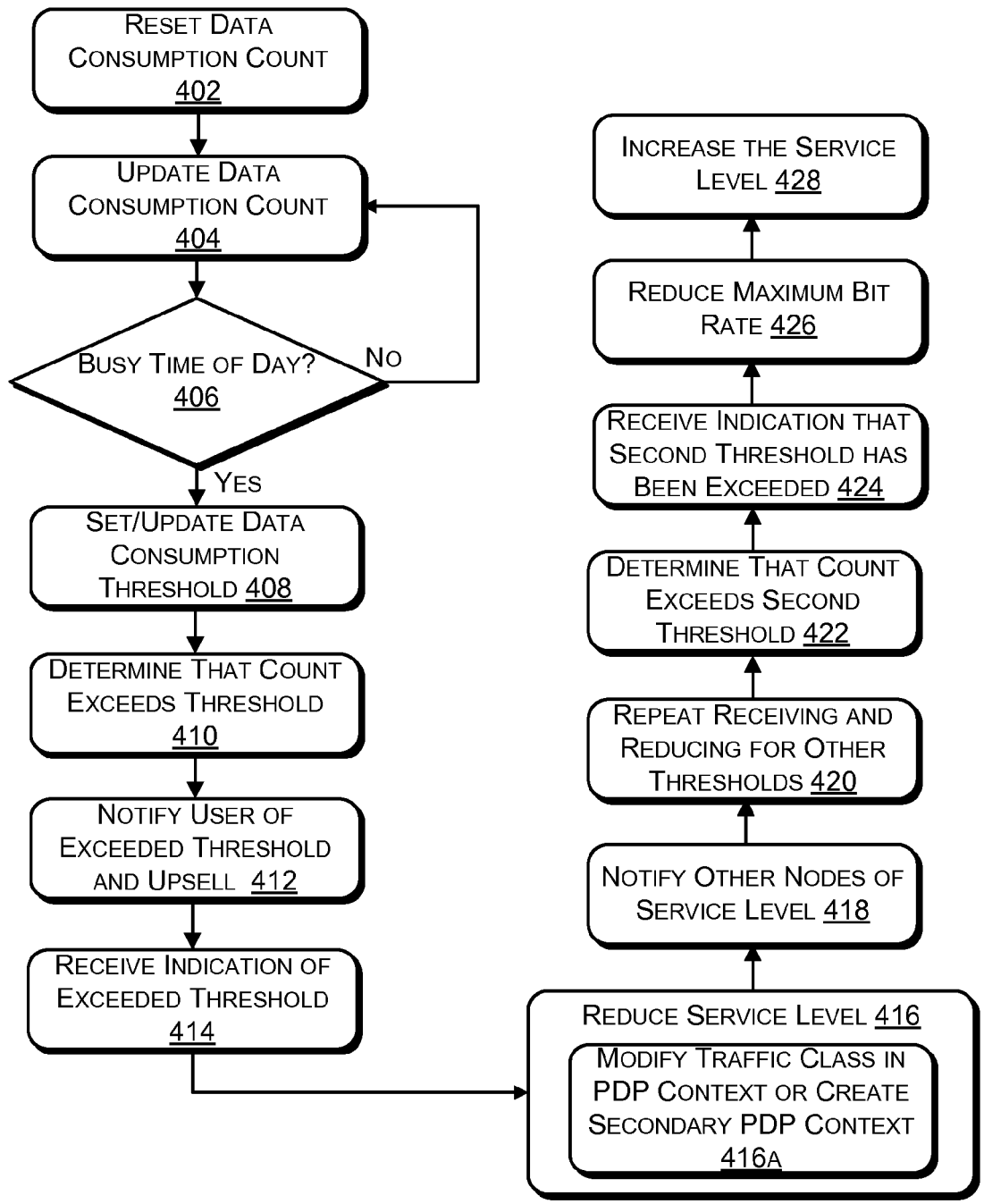
FIG. 4 illustrates a flowchart showing an example method of reducing a service level responsive to a user's data consumption exceeding a first threshold and reducing a maximum bit rate responsive to the user's data consumption exceeding a second threshold, in accordance with various embodiments.

FIG. 4 illustrates a flowchart showing an example method of reducing a service level responsive to a user's data consumption exceeding a first threshold and reducing a maximum bit rate responsive to the user's data consumption exceeding a second threshold, in accordance with various embodiments. As shown at block 402, a device of a telecommunication network, such as the GGSN 210 of the telecommunication network 104, may reset a data consumption count and service levels associated with a user at the beginning of a billing cycle. The data consumption count may be a single measure of the user's data consumption over the telecommunication network or may be multiple measures associated with different types of data or applications. In one embodiment, the data consumption count includes both a measure of the user's entire data consumption as well as measures associated with different types of data or applications. In another embodiment, different data consumption measures are associated with different devices of the user. In further embodiments, the device may maintain the service levels associated with the user across multiple billing cycles.

At block 404, the device of the telecommunication network, such as the GGSN 210, may update the data consumption count based on recent activity of the user. For example, if the user has recently consumed ten megabytes of video data, the device may update counts for total data consumption, data consumption associated with video data or a video application, or both total and data-type/application-specific consumption.

At decision block 406, the device of the telecommunication network, such as the GGSN 210, determines if the current time is considered a "busy time of day" (i.e., a time of day associated with usage of the telecommunication network or of one or more cells of the telecommunication network exceeding some threshold). If the current time is not a busy time of day, the device of the telecommunication network proceeds to wait for further data consumption and update the data consumption count at block 404. If the current time is considered a busy time of day, the device of the telecommunication network may inform another device, such as the metering platform 218 of the telecommunication network 104, of the updated data consumption count.

At block 408, a device of the telecommunication network may set or update data consumption thresholds. The device may be the metering platform 218, EIT 220, or a learning server or system. The set or updated data consumption threshold may be specified by an operator or determined using machine learning techniques. In another embodiment, different data consumption thresholds are associated with different devices of the user.

At block 410, a device of the telecommunication network, such as the metering platform 218, may determine that the updated data consumption count exceeds a set/updated data consumption threshold. At block 412, upon determining that the data consumption exceeds the threshold, a device of the telecommunication network, such as the metering platform 218 or another device of the telecommunication network 104, may notify the user that the data consumption threshold has been exceeded and offer the user an opportunity to purchase a maintained or upgraded QoS for the remainder of the billing cycle. The device of the telecommunication network may then provide an indication to another device of the telecommunication network, such as the PCRF Node 216 of the telecommunication network 104, that the data consumption exceeds the threshold.

At block 414, a device of the telecommunication network, such as the PCRF Node 216, may receive the provided indication of the exceeded threshold. In response, at block 416, the device may reduce a service level associated with the QoS offered by the telecommunication network to the user. In some embodiments, at block 416a, the device may reduce the service level by modifying a QoS traffic class in a PDP context associated with the user, by creating a secondary PDP context that specifies the reduced service level, or by creating or modifying a service data flow. Also, the service level may be application-specific or data-type-specific. In other embodiments, the device may reduce the value of a setting associated with content-quality, such as a compression metric.

At block 418, a device of the telecommunication network, such as the PCRF Node 216, notifies other devices of the telecommunication network of the reduced service level to enable the other devices to apply the reduced service level. In some embodiments, one or more devices associated with a specific cell of the telecommunication network may conditionally apply the reduced service level throughout the remainder of the billing cycle based on one or both of time of day or congestion conditions of the cell. Also, if the service level is application-specific or data-type-specific, the service level may be conditionally applied to data consumption that is associated with the application or data-type.

At block 420, one or more devices of the telecommunication network may repeat one or more of the operations shown at blocks 408-418 for one or more other thresholds. The one or more other thresholds may be associated with increasingly larger amounts of data consumption.

At block 422, a device of the telecommunication network, such as the metering platform 218, determines if the data consumption count exceeds a second threshold. The second threshold may be greater than the first threshold and any other thresholds evaluated at block 420. Upon determining that the data consumption exceeds the second threshold, the device provides an indication to another device of the telecommunication network, such as the PCRF Node 216, that the data consumption exceeds the second threshold.

At block 424, a device of the telecommunication network, such as the PCRF Node 216, may receive the provided indication of the exceeded second threshold. In response, at block 426, the device may reduce the maximum bit rate at which the telecommunication network 104 provides services to the user. The reduced maximum bit rate may apply throughout the remainder of the billing cycle.

At block 428, a device of the telecommunication network, such as the PCRF node 216, increases the previously reduced service level so that users are only affected by one of a reduced service level and reduced maximum bit rate, not both.

Figure 5:
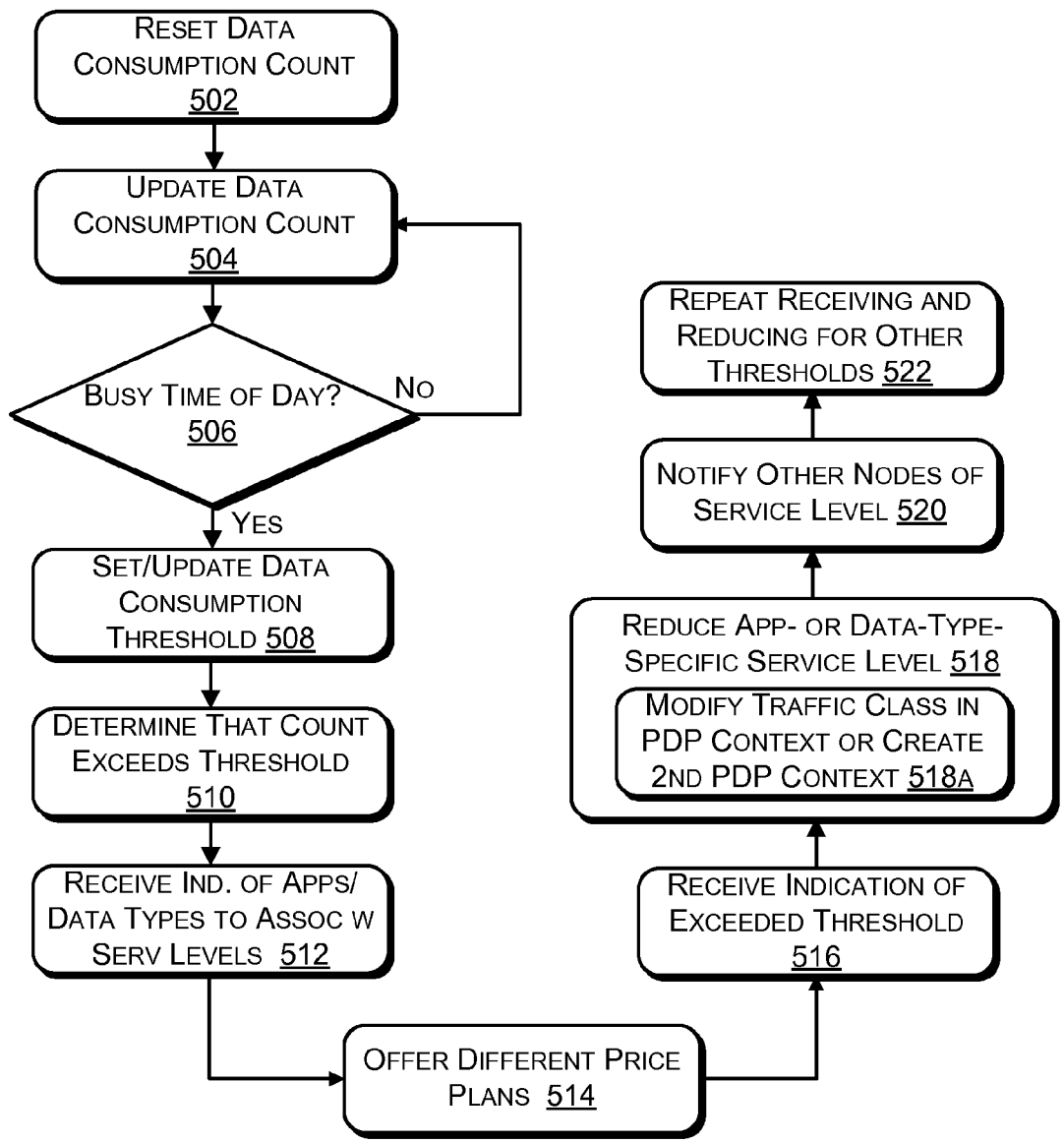
FIG. 5 illustrates a flowchart showing an example method of reducing an application-specific or data-type-specific service level responsive to a user's data consumption exceeding a threshold, in accordance with various embodiments.

FIG. 5 illustrates a flowchart showing an example method of reducing an application-specific or data-type-specific service level responsive to a user's data consumption exceeding a threshold, in accordance with various embodiments. As shown at block 502, a device of a telecommunication network, such as the GGSN 210 of the telecommunication network 104, may reset a data consumption count and service levels associated with a user at the beginning of a billing cycle. The data consumption count may be a single measure of the user's data consumption over the telecommunication network or may be multiple measures associated with different types of data or applications. In one embodiment, the data consumption count includes both a measure of the user's entire data consumption as well as measures associated with different types of data or applications. In another embodiment, different data consumption measures are associated with different devices of the user. In further embodiments, the device may maintain the service levels associated with the user across multiple billing cycles.

At block 504, the device of the telecommunication network, such as the GGSN 210, may update the data consumption count based on recent activity of the user. For example, if the user has recently consumed ten megabytes of video data, the device may update counts for total data consumption, data consumption associated with video data or a video application, or both total and data-type/application-specific consumption.

At decision block 506, the device of the telecommunication network, such as the GGSN 210, determines if the current time is considered a "busy time of day" (i.e., a time of day associated with usage of the telecommunication network or of one or more cells of the telecommunication network exceeding some threshold). If the current time is not a busy time of day, the device of the telecommunication network proceeds to wait for further data consumption and update the data consumption count at block 504. If the current time is considered a busy time of day, the device of the telecommunication network may inform another device, such as the metering platform 218 of the telecommunication network 104, of the updated data consumption count.

At block 508, a device of the telecommunication network may set or update data consumption thresholds. The device may be the metering platform 218, EIT 220, or a learning server or system. The set or updated data consumption threshold may be specified by an operator or determined using machine learning techniques. In another embodiment, different data consumption thresholds are associated with different devices of the user.

At block 510, a device of the telecommunication network, such as the metering platform 218, may determine that the updated data consumption count exceeds a set/updated data consumption threshold.

At block 512, a device of the telecommunication network, such as the GGSN 210, may provide one or more other devices of the telecommunication network, such as the metering platform 218 or the PCRF Node 216 of the telecommunication network 104, with indications of applications or data types to associate with specific service levels, the providing application-specific or data-type-specific service levels. The applications or data types may include peer-to-peer, web, audio/video, audio, video, platform updates, application updates, real-time gaming, or file transfers.

At block 514, upon determining that the data consumption exceeds the threshold, a device of the telecommunication network, such as the metering platform 218 or another device of the telecommunication network 104, may notify the user that the data consumption threshold has been exceeded and offer the user different price plans, such as plans providing an opportunity to purchase a maintained or upgraded QoS for the remainder of the billing cycle. The device of the telecommunication network may then provide an indication to another device of the telecommunication network, such as the PCRF Node 216, that the data consumption exceeds the threshold.

At block 516, a device of the telecommunication network, such as the PCRF Node 216, may receive the provided indication of the exceeded threshold. In response, at block 518, the device may reduce an application-specific or data-type-specific service level associated with the QoS offered by the telecommunication network to the user. In some embodiments, at block 518a, the device may reduce the application-specific or data-type-specific service level by modifying a QoS traffic class in a PDP context associated with the user, by creating a secondary PDP context that specifies the reduced service level, or by creating or modifying a service data flow. In other embodiments, the device may reduce the application-specific or data-type-specific service level by reducing the value of a setting associated with content-quality, such as a compression metric.

At block 520, a device of the telecommunication network, such as the PCRF Node 216, notifies other devices of the telecommunication network of the application-specific or data-type-specific reduced service level to enable the other devices to apply the reduced application-specific or data-type-specific service level. In some embodiments, one or more devices associated with a specific cell of the telecommunication network may conditionally apply the reduced application-specific or data-type-specific service level throughout the remainder of the billing cycle based on one or both of time of day or congestion conditions of the cell.

At block 522, one or more devices of the telecommunication network may repeat one or more of the operations shown at blocks 508-520 for one or more other thresholds. The one or more other thresholds may be associated with increasingly larger amounts of data consumption.

Figure 6:
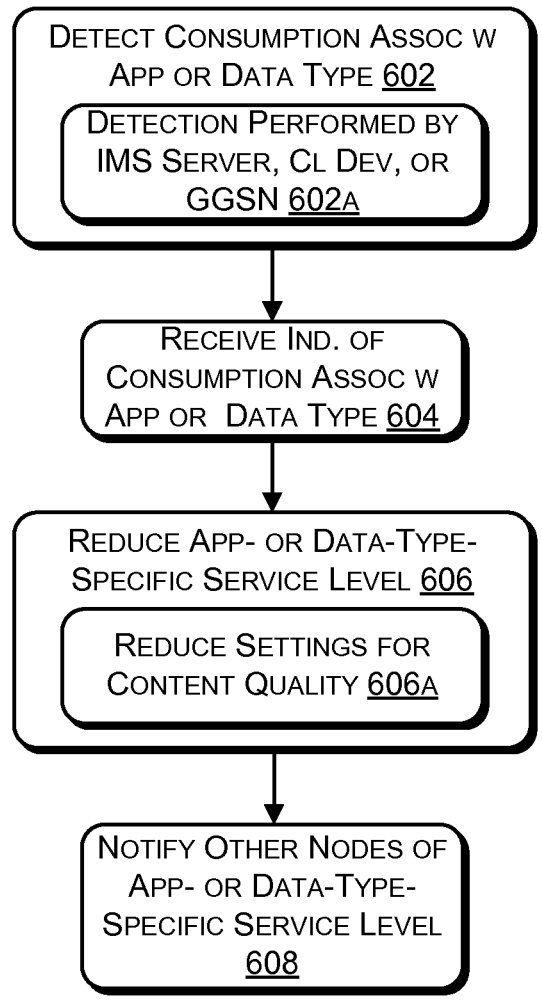
FIG. 6 illustrates a flowchart showing an example method of reducing an application-specific or data-type-specific service level responsive to a user's consumption of data associated with a specific application or data type, in accordance with various embodiments.

FIG. 6 illustrates a flowchart showing an example method of reducing a application-specific or data-type-specific service level responsive to a user's consumption of data associated with a specific application or data type, in accordance with various embodiments. As shown at block 602, a device of a telecommunication network detects data consumption or communication related to a specific application or data type. In some embodiments, at block 602a, the device may be one of an IMS server 228 of the telecommunication network 104, a client device 102 of the telecommunication network 104 (such as the client device 102 that is engaged in the data consumption or communication), or a GGSN 210 of the telecommunication network 104. The device detecting the consumption or communication may then provide an indication of the consumption or communication to be transmitted to another device of the telecommunication network, such as the PCRF Node 216 of the telecommunication network 104.

At block 604, a device of the telecommunication network, such as the PCRF Node 216, may receive the indication of the consumption or communication associated with the application or data type. In response, at block 606, the device may reduce an application-specific or data-type-specific service level associated with the QoS offered by the telecommunication network to the user. In some embodiments, at block 606a, the device may reduce the content-quality of the data consumed by the client device 102. The device may reduce the content quality through compression, sampling, or other mechanisms. In some embodiments, multiple ones of the applications and data types may be associated with different service levels.

At block 608, a device of the telecommunication network, such as the PCRF Node 216, notifies other devices of the telecommunication network of the application-specific or data-type-specific reduced service level to enable the other devices to apply the reduced application-specific or data-type-specific service level. In some embodiments, one or more devices associated with a specific cell of the telecommunication network may conditionally apply the reduced application-specific or data-type-specific service level throughout the remainder of the billing cycle based on one or both of time of day or congestion conditions of the cell.

Figure 7:
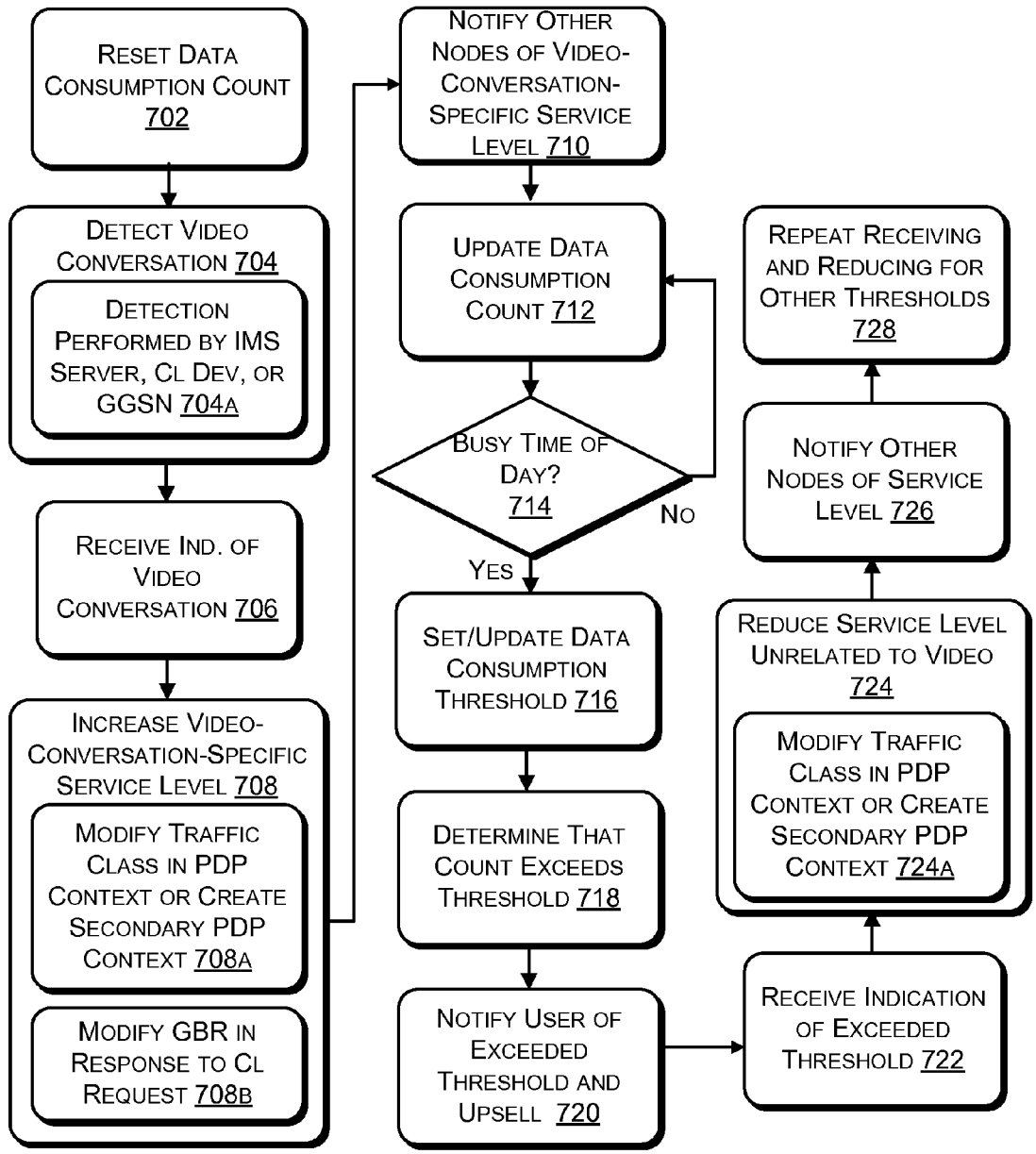
FIG. 7 illustrates a flowchart showing an example method of increasing a video-conversation-specific service level responsive to determining that the user is establishing a video conversation, in accordance with various embodiments.

FIG. 7 illustrates a flowchart showing an example method of increasing a video-conversation-specific service level responsive to determining that the user is establishing a video conversation, in accordance with various embodiments. As shown at block 702, a device of a telecommunication network, such as the GGSN 210 of the telecommunication network 104, may reset a data consumption count and service levels associated with a user at the beginning of a billing cycle. The data consumption count may be a single measure of the user's data consumption over the telecommunication network or may be multiple measures associated with different types of data or applications. In one embodiment, the data consumption count includes both a measure of the user's entire data consumption as well as measures associated with different types of data or applications. In another embodiment, different data consumption measures are associated with different devices of the user. In further embodiments, the device may maintain the service levels associated with the user across multiple billing cycles.

At block 704, a device of a telecommunication network detects that a client device associated with the user is establishing or engaging in a video conversation. In some embodiments, at block 704a, the device may be one of an IMS server 228 of the telecommunication network 104, a client device 102 of the telecommunication network 104 (such as the client device 102 that is establishing or engaged in the video conversation), or a GGSN 210 of the telecommunication network 104. The device detecting the video conversation may then provide an indication of the video conversation to be transmitted to another device of the telecommunication network, such as the PCRF Node 216 of the telecommunication network 104.

At block 706, a device of the telecommunication network, such as the PCRF Node 216, may receive the indication of the video conversation. In response, at block 708, the device may increase a video-conversation-specific service level associated with the QoS offered by the telecommunication network to the user. In some embodiments, at block 708a, the device may increase the video-conversation-specific service level by modifying a QoS traffic class in a PDP context associated with the user, by creating a secondary PDP context that specifies the increased service level, or by creating or modifying a service data flow. In other embodiments, at block 708b, the device may increase the service level by modifying the guaranteed bit rate (GBR) responsive to a client device request for a modified GBR. In some embodiments, upon receiving the indication at block 706, the device offers the user an opportunity to purchase an increased service level for the video conversation. In one embodiment, the increasing of block 708 is performed conditionally based on whether the user purchases an increased service level.

At block 710, a device of the telecommunication network, such as the PCRF Node 216, notifies other devices of the telecommunication network of the increased video-conversation-specific service level to enable the other devices to apply the increased video-conversation-specific service level.

At block 712, the device of the telecommunication network, such as the GGSN 210, may update the data consumption count based on recent activity of the user. For example, if the user has recently consumed ten megabytes of video data, the device may update counts for total data consumption, data consumption associated with video data or a video application, or both total and data-type/application-specific consumption.

At decision block 714, the device of the telecommunication network, such as the GGSN 210, determines if the current time is considered a "busy time of day" (i.e., a time of day associated with usage of the telecommunication network or of one or more cells of the telecommunication network exceeding some threshold). If the current time is not a busy time of day, the device of the telecommunication network proceeds to wait for further data consumption and update the data consumption count at block 712. If the current time is considered a busy time of day, the device of the telecommunication network may inform another device, such as the metering platform 218 of the telecommunication network 104, of the updated data consumption count.

At block 716, a device of the telecommunication network may set or update data consumption thresholds. The device may be the metering platform 218, EIT 220, or a learning server or system. The set or updated data consumption threshold may be specified by an operator or determined using machine learning techniques. In another embodiment, different data consumption thresholds are associated with different devices of the user.

At block 718, a device of the telecommunication network, such as the metering platform 218, may determine that the updated data consumption count exceeds a set/updated data consumption threshold. At block 720, upon determining that the data consumption exceeds the threshold, a device of the telecommunication network, such as the metering platform 218 or another device of the telecommunication network 104, may notify the user that the data consumption threshold has been exceeded and offer the user an opportunity to purchase a maintained or upgraded QoS for the remainder of the billing cycle. The device of the telecommunication network may then provide an indication to another device of the telecommunication network, such as the PCRF Node 216 of the telecommunication network 104, that the data consumption exceeds the threshold.

At block 722, a device of the telecommunication network, such as the PCRF Node 216, may receive the provided indication of the exceeded threshold. In response, at block 724, the device may reduce a service level associated with the QoS offered by the telecommunication network to the user. In some embodiments, at block 724a, the device may reduce the service level by modifying a QoS traffic class in a PDP context associated with the user, by creating a secondary PDP context that specifies the reduced service level, or by creating or modifying a service data flow. Also, the service level may be application-specific or data-type-specific. In other embodiments, the device may reduce the value of a setting associated with content-quality, such as a compression metric.

At block 726, a device of the telecommunication network, such as the PCRF Node 216, notifies other devices of the telecommunication network of the reduced service level to enable the other devices to apply the reduced service level to non-video-conversation data consumption. In some embodiments, one or more devices associated with a specific cell of the telecommunication network may conditionally apply the reduced service level throughout the remainder of the billing cycle based on one or both of time of day or congestion conditions of the cell. Also, if the service level is application-specific or data-type-specific, the service level may be conditionally applied to data consumption that is associated with the application or data-type.

At block 728, one or more devices of the telecommunication network may repeat one or more of the operations shown at blocks 716-726 for one or more other thresholds. The one or more other thresholds may be associated with increasingly larger amounts of data consumption.

Figure 8:
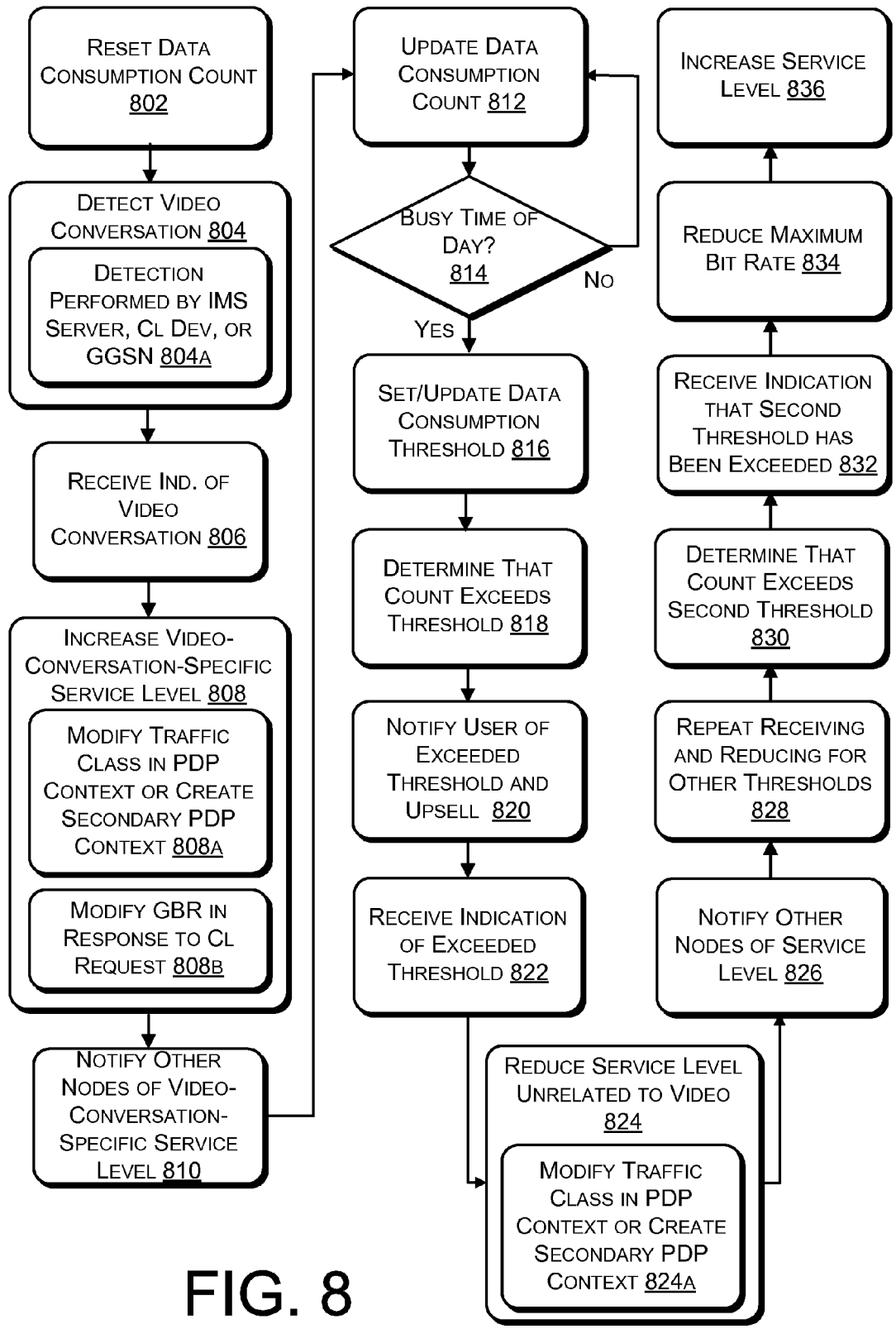
FIG. 8 illustrates a flowchart showing an example method of increasing a video-conversation-specific service level responsive to determining that the user is establishing a video conversation and reducing another service level to be applied for data consumption unrelated to the video conversation responsive to the user's data consumption exceeding a threshold, in accordance with various embodiments.

FIG. 8 illustrates a flowchart showing an example method of increasing a video-conversation-specific service level responsive to determining that the user is establishing a video conversation and reducing another service level to be applied for data consumption unrelated to the video conversation responsive to the user's data consumption exceeding a threshold, in accordance with various embodiments. As shown at block 802, a device of a telecommunication network, such as the GGSN 210 of the telecommunication network 104, may reset a data consumption count and service levels associated with a user at the beginning of a billing cycle. The data consumption count may be a single measure of the user's data consumption over the telecommunication network or may be multiple measures associated with different types of data or applications. In one embodiment, the data consumption count includes both a measure of the user's entire data consumption as well as measures associated with different types of data or applications. In another embodiment, different data consumption measures are associated with different devices of the user. In further embodiments, the device may maintain the service levels associated with the user across multiple billing cycles.

At block 804, a device of a telecommunication network detects that a client device associated with the user is establishing or engaging in a video conversation. In some embodiments, at block 804a, the device may be one of an IMS server 228 of the telecommunication network 104, a client device 102 of the telecommunication network 104 (such as the client device 102 that is establishing or engaged in the video conversation), or a GGSN 210 of the telecommunication network 104. The device detecting the video conversation may then provide an indication of the video conversation to be transmitted to another device of the telecommunication network, such as the PCRF Node 216 of the telecommunication network 104.

At block 806, a device of the telecommunication network, such as the PCRF Node 216, may receive the indication of the video conversation. In response, at block 808, the device may increase a video-conversation-specific service level associated with the QoS offered by the telecommunication network to the user. In some embodiments, at block 808a, the device may increase the video-conversation-specific service level by modifying a QoS traffic class in a PDP context associated with the user, by creating a secondary PDP context that specifies the increased service level, or by creating or modifying a service data flow. In other embodiments, at block 808b, the device may increase the service level by modifying the guaranteed bit rate (GBR) responsive to a client device request for a modified GBR. In some embodiments, upon receiving the indication at block 806, the device offers the user an opportunity to purchase an increased service level for the video conversation. In one embodiment, the increasing of block 808 is performed conditionally based on whether the user purchases an increased service level.

At block 810, a device of the telecommunication network, such as the PCRF Node 216, notifies other devices of the telecommunication network of the increased video-conversation-specific service level to enable the other devices to apply the increased video-conversation-specific service level.

At block 812, the device of the telecommunication network, such as the GGSN 210, may update the data consumption count based on recent activity of the user. For example, if the user has recently consumed ten megabytes of video data, the device may update counts for total data consumption, data consumption associated with video data or a video application, or both total and data-type/application-specific consumption.

At decision block 814, the device of the telecommunication network, such as the GGSN 210, determines if the current time is considered a "busy time of day" (i.e., a time of day associated with usage of the telecommunication network or of one or more cells of the telecommunication network exceeding some threshold). If the current time is not a busy time of day, the device of the telecommunication network proceeds to wait for further data consumption and update the data consumption count at block 812. If the current time is considered a busy time of day, the device of the telecommunication network may inform another device, such as the metering platform 218 of the telecommunication network 104, of the updated data consumption count.

At block 816, a device of the telecommunication network may set or update data consumption thresholds. The device may be the metering platform 218, EIT 220, or a learning server or system. The set or updated data consumption threshold may be specified by an operator or determined using machine learning techniques. In another embodiment, different data consumption thresholds are associated with different devices of the user.

At block 818, a device of the telecommunication network, such as the metering platform 218, may determine that the updated data consumption count exceeds a set/updated data consumption threshold. At block 820, upon determining that the data consumption exceeds the threshold, a device of the telecommunication network, such as the metering platform 218 or another device of the telecommunication network 104, may notify the user that the data consumption threshold has been exceeded and offer the user an opportunity to purchase a maintained or upgraded QoS for the remainder of the billing cycle. The device of the telecommunication network may then provide an indication to another device of the telecommunication network, such as the PCRF Node 216 of the telecommunication network 104, that the data consumption exceeds the threshold.

At block 822, a device of the telecommunication network, such as the PCRF Node 216, may receive the provided indication of the exceeded threshold. In response, at block 824, the device may reduce a service level associated with the QoS offered by the telecommunication network to the user. In some embodiments, at block 824a, the device may reduce the service level by modifying a QoS traffic class in a PDP context associated with the user, by creating a secondary PDP context that specifies the reduced service level, or by creating or modifying a service data flow. Also, the service level may be application-specific or data-type-specific. In other embodiments, the device may reduce the value of a setting associated with content-quality, such as a compression metric.

At block 826, a device of the telecommunication network, such as the PCRF Node 216, notifies other devices of the telecommunication network of the reduced service level to enable the other devices to apply the reduced service level to non-video-conversation data consumption. In some embodiments, one or more devices associated with a specific cell of the telecommunication network may conditionally apply the reduced service level throughout the remainder of the billing cycle based on one or both of time of day or congestion conditions of the cell. Also, if the service level is application-specific or data-type-specific, the service level may be conditionally applied to data consumption that is associated with the application or data-type.

At block 828, one or more devices of the telecommunication network may repeat one or more of the operations shown at blocks 816-826 for one or more other thresholds. The one or more other thresholds may be associated with increasingly larger amounts of data consumption.

At block 830, a device of the telecommunication network, such as the metering platform 218, determines if the data consumption count exceeds a second threshold. The second threshold may be greater than the first threshold and any other thresholds evaluated at block 828. Upon determining that the data consumption exceeds the second threshold, the device provides an indication to another device of the telecommunication network, such as the PCRF Node 216, that the data consumption exceeds the second threshold.

At block 832, a device of the telecommunication network, such as the PCRF Node 216, may receive the provided indication of the exceeded second threshold. In response, at block 834, the device may reduce the maximum bit rate at which the telecommunication network 104 provides services to the user. The reduced maximum bit rate may apply throughout the remainder of the billing cycle.

At block 836, a device of the telecommunication network, such as the PCRF node 216, increases the previously reduced service level so that users are only affected by one of a reduced service level and reduced maximum bit rate, not both.

Example Systems

FIG. 9 illustrates an example computing device system architecture, such as a system architecture of one of the computing devices of the telecommunication network 104 or a system architecture of the client device 102, in accordance with various embodiments. As illustrated, the computing device 900 includes processor(s) 902, a system memory 904 storing modules 906 and data 908, a removable storage 910, a non-removable storage 912, input device(s) 914, output device(s) 916, and communication connections 918 for communicating with other computing devices 920.

In some embodiments, the processor(s) 902 is a central processing unit (CPU), a graphics processing unit (GPU), or both CPU and GPU, or other processing unit or component known in the art.

In various embodiments, system memory 904 is volatile (such as RAM), non-volatile (such as ROM, flash memory, etc.) or some combination of the two. Example system memory 904 may include one or more of RAM, ROM, EEPROM, a Flash Memory, a miniature hard drive, a memory card, an optical storage, a magnetic cassette, a magnetic tape, a magnetic disk storage or another magnetic storage device, or any other medium.

As previously mentioned, the system memory 904 stores modules 906 and data 908. These modules 906 and data 908 may comprise any one or more modules, applications, processes, threads, classes, algorithms, data structures, files, and/or databases, such as the modules, applications, processes, threads, classes, algorithms, data structures, files, and/or databases utilized in performing the operations described above, some part of which are illustrated in FIGS. 3-8.

The computing device 900 includes data storage devices (removable and/or non-removable) in addition to the system memory 904, such as, for example, magnetic disks, optical disks, or tape. Such additional storage is illustrated in FIG. 9 by removable storage 910 and non-removable storage 912. Computer storage media may include volatile and nonvolatile, removable and non-removable media implemented in any method or technology for storage of information, such as computer readable instructions, data structures, program modules, or other data. System memory 904, removable storage 910, and non-removable storage 912 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 900. Any such computer-readable storage media may be part of the computing device 900.

In various embodiment, any or all of system memory 904, removable storage 910, and non-removable storage 912 store programming instructions which, when executed, implement some or all of the above-described operations of the computing device 900.

The computing device 900 also has input device(s) 914, such as a keyboard, a mouse, a touch-sensitive display, voice input device, etc., and output device(s) 916 such as a display, speakers, a printer, etc. These devices are well known in the art and need not be discussed at length here.

The computing device 900 also contains communication connections 918 that allow the computing device 900 to communicate with other computing devices 920.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
   receiving, by a service provider device of a service provider operating a telecommunication network, an indication that a user's consumption of data over the telecommunication network has exceeded a threshold, the threshold being one of a plurality of thresholds associated with increasingly larger amounts of data consumption;
   in response to receiving the indication, reducing, by the service provider device, a service level specific to the user, the service level being associated with a quality of service provided by the telecommunication network to one or more devices of the user;
   determining that the user's consumption of data over the telecommunication network has exceeded a second threshold;
   in response to determining that the user's data consumption has exceeded the second threshold, reducing a maximum bit rate at which at least one of the one or more devices of the user is able to communicate with the telecommunication network; and
   increasing the reduced service level while reducing the maximum bit rate.

2. The method of claim 1, further comprising resetting the service level at an end of a billing cycle or maintaining the service level for multiple billing cycles.

3. The method of claim 1, wherein the service level is one of a priority level or a content-quality level.

4. The method of claim 3, wherein the content-quality level is associated with one of higher compression or lower quality video, lower quality images, lower quality graphics, lower quality text, or lower quality audio.

5. The method of claim 1, further comprising providing the reduced service level to one or more other nodes of the telecommunication network for the one or more other nodes apply the reduced service level.

6. The method of claim 1, further comprising performing the receiving and the reducing at a time of day associated with a larger amount of network traffic than other times of day.

7. The method of claim 1, further comprising performing the receiving and the reducing for a third threshold of the plurality of thresholds, the third threshold being greater than a first threshold and less than the second threshold.

8. The method of claim 1, wherein the indication is received from another node of the telecommunication network, the other node of the telecommunication network determining whether the user's consumption of data exceeds the threshold.

9. The method of claim 1, wherein reducing the service level comprises modifying a traffic class associated with a packet data protocol (PDP) context for the user, creating a secondary PDP context for the user, or creating a service data flow for the user.

10. The method of claim 1, further comprising notifying the user when the threshold is reached and offering the user an opportunity to purchase a maintained or increased service level.

11. The method of claim 1, wherein the threshold is set by a learning server based on machine learning techniques.

12. The method of claim 1, wherein different thresholds and data consumption measures are associated with different ones of the one or more devices of the user.

13. The method of claim 1, wherein the service provider device is a policy and charging rules function (PCRF) node of the telecommunication network.

14. One or more non-transitory computer storage media comprising computer-executable instructions stored thereon and configured to program one or more service provider devices of a service provider operating a telecommunication network to perform operations including:
   receiving an indication that a user's consumption of data over the telecommunication network has exceeded a threshold; and
   in response to receiving the indication, reducing an application-specific or data-type-specific service level specific to the user, the application-specific or data-type-specific service level being associated with a quality of service offered by the telecommunication network to one or more devices of the user, the reducing performed conditionally based on telecommunication network conditions;
   determining that the user's consumption of data over the telecommunication network has exceeded a second threshold;

in response to determining that the user's data consumption has exceeded the second threshold, reducing a maximum bit rate at which at least one of the one or more devices of the user is able to communicate with the telecommunication network; and increasing the reduced service level while reducing the maximum bit rate.

15. The one or more non-transitory computer storage media of claim 14, wherein the application or data type is one of peer-to-peer, web, audio, video, platform updates, application updates, real-time gaming, or file transfers.

16. The one or more non-transitory computer storage media of claim 15, wherein the operations further include offering different price plans for different applications or data types to enable the user to purchase a maintained or elevated service level for data communication associated with an application or a data type.

17. The one or more non-transitory computer storage media of claim 14, wherein the operations further include receiving indications of applications and data types to associate with service levels.

18. A system associated with a telecommunication network, comprising:

one or more processors; and a memory coupled to the one or more processors and including instructions configured to be executed on the one or more processors to program one or more service provider devices of a service provider operating the telecommunication network to perform operations including:

determining that a user's consumption of data over the telecommunication network has exceeded a first threshold;

in response to determining that the user's data consumption has exceeded the first threshold, reducing a service level associated with a quality of service provided by the telecommunication network to the user;

determining that the user's consumption of data over the telecommunication network has exceeded a second threshold, the second threshold being greater than the first threshold;

in response to determining that the user's data consumption has exceeded the second threshold, reducing a maximum bit rate at which a device of the user is able to communicate with the telecommunication network; and in response to determining that the user's data consumption has exceeded the second threshold, increasing the service level while reducing the maximum bit rate.

19. The system of claim 18, wherein the service level is one of a priority level or a content-quality level.

\* \* \* \* \*